United States Patent
Chen et al.

(10) Patent No.: US 10,152,929 B2
(45) Date of Patent: Dec. 11, 2018

(54) LIQUID CRYSTAL PANELS AND THE DRIVING METHOD THEREOF

(71) Applicant: Shenzhen China Star Optoelectronics Technology Co., Ltd., Shenzhen, Guangdong (CN)

(72) Inventors: Cheng-hung Chen, Guangdong (CN); Jiali Jiang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 172 days.

(21) Appl. No.: 14/890,404

(22) PCT Filed: Oct. 21, 2015

(86) PCT No.: PCT/CN2015/092362
§ 371 (c)(1),
(2) Date: Nov. 10, 2015

(87) PCT Pub. No.: WO2017/054263
PCT Pub. Date: Apr. 6, 2017

(65) Prior Publication Data
US 2017/0186382 A1    Jun. 29, 2017

(30) Foreign Application Priority Data
Sep. 30, 2015    (CN) .......................... 2015 1 0643813

(51) Int. Cl.
*G09G 3/36*    (2006.01)
*G02F 1/1335*  (2006.01)
(Continued)

(52) U.S. Cl.
CPC ......... *G09G 3/3607* (2013.01); *G02F 1/1368* (2013.01); *G02F 1/13439* (2013.01);
(Continued)

(58) Field of Classification Search
CPC ................ G09G 3/3607; G09G 3/3688; G02F 1/133514; G02F 1/134309; G02F 1/13439;
(Continued)

(56) References Cited

U.S. PATENT DOCUMENTS 6,226,057 B1 * 5/2001 Lee .................... G02F 1/134336
                                                                349/139
6,943,506 B2 * 9/2005 Moon ................. H05B 41/2856
                                                                315/323
(Continued)

FOREIGN PATENT DOCUMENTS

CN    201159814 Y    12/2008
CN    101510037 A    8/2009
(Continued)

*Primary Examiner* — Sejoon Ahn
(74) *Attorney, Agent, or Firm* — Andrew C. Cheng

(57) ABSTRACT

A liquid crystal panel and the driving method thereof are disclosed. The liquid crystal panel includes at least one storage electrode, a plurality of scanning lines, a plurality of data lines, and a plurality of pixel areas. Each of the pixel areas includes a pixel electrode, a first TFT and a second TFT. The first TFT drives the corresponding pixel electrode. The gate of the second TFT connects with the previous scanning line, and one of the source and the drain of the second TFT connects to the corresponding pixel electrode within the pixel area, and the other one connects with the storage electrode. In this way, the optimal common voltage is applied to the liquid crystal panel when the liquid crystal panel is in a displaying process, and thus the display performance is guaranteed.

5 Claims, 2 Drawing Sheets

(51) Int. Cl.
  *G02F 1/1343* (2006.01)
  *G02F 1/1362* (2006.01)
  *G02F 1/1368* (2006.01)

(52) U.S. Cl.
  CPC .. *G02F 1/133514* (2013.01); *G02F 1/134309* (2013.01); *G02F 1/136213* (2013.01); *G02F 1/136286* (2013.01); *G09G 3/3688* (2013.01); *G02F 1/13624* (2013.01); *G02F 2201/121* (2013.01); *G02F 2201/123* (2013.01); *G09G 2300/0426* (2013.01); *G09G 2300/0823* (2013.01)

(58) Field of Classification Search
  CPC ......... G02F 1/136213; G02F 1/136286; G02F 1/1368
  See application file for complete search history.

(56) References Cited

U.S. PATENT DOCUMENTS

| | | | |
|---|---|---|---|
| 7,843,419 B2 | 11/2010 | Chen et al. | |
| 8,098,219 B2* | 1/2012 | Kim | G02F 1/13624 345/87 |
| 8,462,305 B2* | 6/2013 | Jung | G02F 1/133753 349/141 |
| 9,007,291 B2* | 4/2015 | Lee | G09G 3/3655 345/204 |
| 9,064,463 B2* | 6/2015 | Jung | G09G 3/348 |
| 2002/0074580 A1* | 6/2002 | Anzai | G09G 3/3233 257/290 |
| 2002/0075254 A1 | 6/2002 | Anzai | |
| 2002/0121639 A1* | 9/2002 | So | H01L 27/3248 257/72 |
| 2003/0067458 A1* | 4/2003 | Anzai | G09G 3/3225 345/204 |
| 2003/0227433 A1* | 12/2003 | Moon | G09G 3/3677 345/100 |
| 2004/0251465 A1* | 12/2004 | Yamazaki | G09G 3/2014 257/79 |
| 2005/0212735 A1* | 9/2005 | Lin | G09G 3/3611 345/87 |
| 2007/0035492 A1* | 2/2007 | Chang | G09G 3/003 345/87 |
| 2007/0128583 A1* | 6/2007 | Miyazawa | G09G 3/3233 434/433 |
| 2007/0296660 A1* | 12/2007 | Kimura | G09G 3/20 345/87 |
| 2008/0024709 A1 | 1/2008 | Moon | |
| 2008/0067512 A1 | 3/2008 | Lee et al. | |
| 2008/0117156 A1* | 5/2008 | Chen | G09G 3/2011 345/92 |
| 2008/0284929 A1* | 11/2008 | Kimura | G02F 1/13624 349/38 |
| 2013/0100106 A1* | 4/2013 | Wu | G09G 3/2025 345/212 |
| 2013/0187554 A1* | 7/2013 | Ono | G09G 3/3266 315/172 |
| 2014/0071028 A1* | 3/2014 | Han | G09G 3/3266 345/77 |
| 2015/0029239 A1* | 1/2015 | Park | G09G 3/3241 345/691 |
| 2016/0148590 A1* | 5/2016 | Chen | G09G 3/3655 345/98 |
| 2017/0162139 A1 | 6/2017 | Chen et al. | |

FOREIGN PATENT DOCUMENTS

| | | |
|---|---|---|
| CN | 101776825 A | 7/2010 |
| CN | 101976545 A | 2/2011 |

\* cited by examiner

LIQUID CRYSTAL PANELS AND THE DRIVING METHOD THEREOF

BACKGROUND OF THE INVENTION

1. Field of the Invention

The present disclosure relates to liquid crystal display technology, and more particularly to a liquid crystal panel and the driving method thereof.

2. Discussion of the Related Art

Liquid crystal panels display different pixel grayscales basing on a voltage difference between the common voltage (Vcom) and the grayscale voltage. To prevent the liquid crystal molecules from being polarized, the positive and the negative polarity of the grayscale voltage have to be inversed by alternated driving methods. The poor common voltage may affect the display performance of the liquid crystal panel, such as residual or flicker. Thus, before the liquid crystal panels enter the market, it is better to make sure the best common voltage has been applied. Conventionally, the detection process is performed by manual operations or by machine's automatic operations, which may increase the manufacturing cost and may reduce the productivity.

SUMMARY

The object of the invention is to provide a liquid crystal panel and the driving method thereof. With the configuration, the best common voltage may be applied to the liquid crystal panel when the liquid crystal panel is in a displaying process so as to guarantee the display performance.

In one aspect, a liquid crystal panel includes: at least one storage electrode, a plurality of scanning lines, a plurality of data lines, and a plurality of pixel areas arranged in a matrix defined by the scanning lines and the data lines, wherein each of the pixel areas includes a pixel electrode, a first thin film transistor (TFT) and a second TFT, the first TFT is configured for driving the pixel electrode within the corresponding pixel area, a gate of the second TFT connects with the previous scanning line, one of a source and a drain of the second TFT connects to the corresponding pixel electrode within the pixel area, and the other one connects with a storage electrode; wherein a source of the first TFT connects to the corresponding data line, a drain of the first TFT connects to the corresponding pixel electrode, a gate of the first TFT connects to the corresponding scanning line, wherein the liquid crystal panel further includes a gate driver and a data driver, the scanning lines connect with the gate driver, and the data lines connect with the data driver, the gate driver provides gate driving signals to the scanning lines in sequence to turn on the first TFT and the second TFT corresponding to the scanning lines, the data driver provides grayscale driving signals to the data lines such that the grayscale driving signals are applied to the pixel electrodes via the first TFT, and the grayscale driving signals applied to the pixel electrode is further applied to the storage electrode via the second TFT when the liquid crystal panel displays the previous frame; and the storage electrodes includes first storage electrodes and second storage electrodes, and the first storage electrodes and the second storage electrodes are bar-shaped, the first storage electrodes are parallel to the scanning lines, and the second storage electrodes are parallel to the data lines, the first storage electrodes intersect with the second storage electrodes, and the first storage electrodes are insulated from the second storage electrodes.

Wherein the liquid crystal panel further includes peripheral wirings for connecting the first storage electrode and a common electrode on a color film substrate of the liquid crystal panel and for connecting the second storage electrode and the common electrode.

Wherein the number of the first storage electrodes is the same with the numbers of the second storage electrodes and the pixel electrodes.

In another aspect, a liquid crystal panel includes: at least one storage electrode, a plurality of scanning lines, a plurality of data lines, and a plurality of pixel areas arranged in a matrix defined by the scanning lines and the data lines, wherein each of the pixel areas includes a pixel electrode, a first thin film transistor (TFT) and a second TFT, the first TFT is configured for driving the pixel electrode within the corresponding pixel area, a gate of the second TFT connects with the previous scanning line, one of a source and a drain of the second TFT connects to the corresponding pixel electrode within the pixel area, and the other one connects with a storage electrode.

Wherein the storage electrodes are bar-shaped, and the bar-shaped storage electrodes are parallel to the data line.

Wherein the storage electrodes are bar-shaped, and the bar-shaped storage electrodes are parallel to the scanning line.

Wherein the liquid crystal panel further includes peripheral wirings for connecting the storage electrode and a common electrode on a color film substrate of the liquid crystal panel.

Wherein the storage electrodes includes first storage electrodes and second storage electrodes, and the first storage electrodes and the second storage electrodes are bar-shaped, the first storage electrodes are parallel to the scanning lines, and the second storage electrodes are parallel to the data lines, the first storage electrodes intersect with the second storage electrodes, and the first storage electrodes are insulated from the second storage electrodes.

Wherein the liquid crystal panel further includes peripheral wirings for connecting the first storage electrode and a common electrode on a color film substrate of the liquid crystal panel and for connecting the second storage electrode and the common electrode.

Wherein the number of the first storage electrodes is the same with the numbers of the second storage electrodes and the pixel electrodes.

Wherein a source of the first TFT connects to the corresponding data line, a drain of the first TFT connects to the corresponding pixel electrode, a gate of the first TFT connects to the corresponding scanning line.

Wherein the liquid crystal panel further includes a gate driver and a data driver, the scanning lines connect with the gate driver, and the data lines connect with the data driver, the gate driver provides gate driving signals to the scanning lines in sequence to turn on the first TFT and the second TFT corresponding to the scanning lines, the data driver provides grayscale driving signals to the data lines such that the grayscale driving signals are applied to the pixel electrodes via the first TFT, and the grayscale driving signals applied to the pixel electrode is further applied to the storage electrode via the second TFT when the liquid crystal panel displays the previous frame.

In another aspect, a driving method of liquid crystal panels, the liquid crystal panel includes at least one storage electrode, a plurality of scanning lines, a plurality of data lines, and a plurality of pixel areas arranged in a matrix defined by the scanning lines and the data lines, wherein each of the pixel areas includes a pixel electrode, a first thin film transistor (TFT) and a second TFT, the first TFT is configured for driving the pixel electrode within the corresponding pixel area, a gate of the second TFT connects with the previous scanning line, one of a source and a drain of the second TFT connects to the corresponding pixel electrode within the pixel area, and the other one connects with a storage electrode, the driving method includes: receiving gate driving signals from the scanning lines in sequence and turning on the first TFT and the second TFT corresponding to the scanning lines; and receiving grayscale driving signals from the data lines such that the grayscale driving signals are applied to the pixel electrodes via the first TFT, and the grayscale driving signals applied to the pixel electrode is further applied to the storage electrode via the second TFT when the liquid crystal panel displays the previous frame.

Wherein the storage electrodes are bar-shaped, and the bar-shaped storage electrodes are parallel to the data line.

Wherein the storage electrodes are bar-shaped, and the bar-shaped storage electrodes are parallel to the scanning line.

Wherein the liquid crystal panel further includes peripheral wirings for connecting the storage electrode and a common electrode on a color film substrate of the liquid crystal panel.

Wherein the storage electrodes includes first storage electrodes and second storage electrodes, and the first storage electrodes and the second storage electrodes are bar-shaped, the first storage electrodes are parallel to the scanning lines, and the second storage electrodes are parallel to the data lines, the first storage electrodes intersect with the second storage electrodes, and the first storage electrodes are insulated from the second storage electrodes.

Wherein the liquid crystal panel further includes peripheral wirings for connecting the first storage electrode and a common electrode on a color film substrate of the liquid crystal panel and for connecting the second storage electrode and the common electrode.

Wherein the number of the first storage electrodes is the same with the numbers of the second storage electrodes and the pixel electrodes.

Wherein a source of the first TFT connects to the corresponding data line, a drain of the first TFT connects to the corresponding pixel electrode, a gate of the first TFT connects to the corresponding scanning line, wherein the liquid crystal panel further includes a gate driver and a data driver, the scanning lines connect with the gate driver, and the data lines connect with the data driver, the gate driver provides gate driving signals to the scanning lines in sequence to turn on the first TFT and the second TFT corresponding to the scanning lines, the data driver provides grayscale driving signals to the data lines such that the grayscale driving signals are applied to the pixel electrodes via the first TFT, and the grayscale driving signals applied to the pixel electrode is further applied to the storage electrode via the second TFT when the liquid crystal panel displays the previous frame In view of the above, each of the pixel areas includes two TFTs, wherein one TFT applies the grayscale driving signals to the pixel electrode, and the other one stored the grayscale driving signals applied to the pixel electrode when the previous frame is displayed. As the positive polarity and the negative polarity of the grayscale driving signals (grayscale voltage) is inversed, the common voltage corresponding to two adjacent frames may be balanced. As such, the optimal common voltage is obtained to guarantee the display performance. Manual operations or machine's automatic operations are not needed in the present configuration, and thus the manufacturing cost is decreased and the productivity is ensured.

DETAILED DESCRIPTION OF THE EMBODIMENTS

Embodiments of the invention will now be described more fully hereinafter with reference to the accompanying drawings, in which embodiments of the invention are shown.

Figure 1:
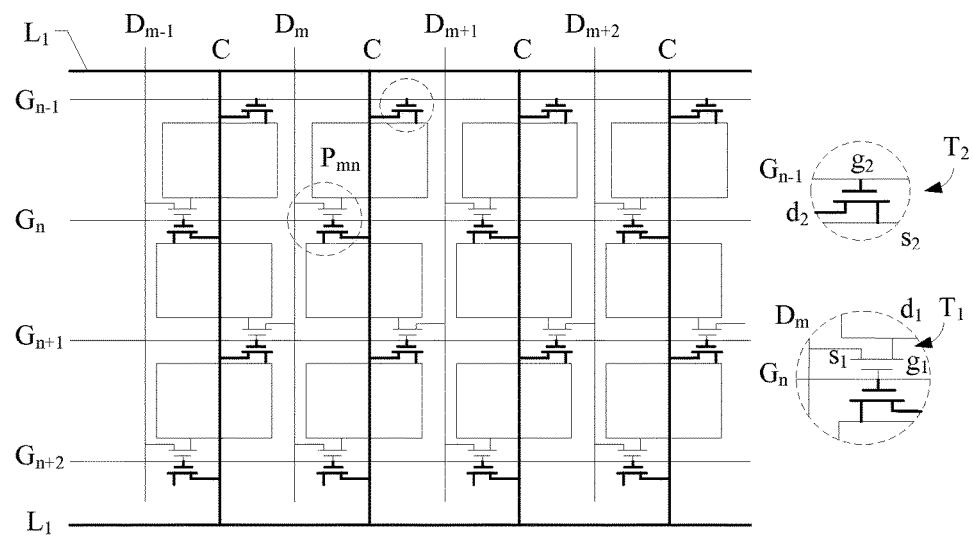
FIG. 1 is a schematic view of the liquid crystal panel in accordance with one embodiment.

FIG. 1 is a schematic view of the liquid crystal panel in accordance with a first embodiment. As shown in FIG. 1, the liquid crystal panel includes a plurality of scanning lines ($G_1 \ldots G_{n-1}, G_n, G_{n+1}, G_{n+2}$) parallel to each other, a plurality of data lines ($D_1 \ldots D_{m-1}, D_m, D_{m+1}, D_{m+2}$) parallel to each other, and a plurality of pixel areas arranged in a matrix. The data lines intersect with the scanning lines, and the data lines are insulated with the scanning lines. The pixel areas are defined by the scanning lines ($G_1 \ldots G_{n-1}, G_n, G_{n+1}, G_{n+2}$) and the data lines ($D_1 \ldots D_{m-1}, D_m, D_{m+1}, D_{m+2}$). For instance, the scanning line ($G_n$) intersects with the data line ($D_m$) to define one pixel area ($P_{mn}$). The pixel area ($P_{mn}$) includes a pixel electrode correspondingly connects to the scanning line ($G_n$) and data line ($D_m$), wherein m and n are positive integer.

Each of the pixel area further includes two thin film transistors (TFTs) including a first TFT ($T_1$) and a second TFT ($T_2$). The first TFT ($T_1$) is configured for driving the pixel electrode to display images, which is equivalent to the only one TFT within each of the pixel areas within the conventional configuration. In the embodiment, the second TFT ($T_2$) is configured within each of the pixel areas. For instance, the gate ($g_1$) of the first TFT ($T_1$) within the pixel area ($P_{mn}$) connects to the scanning line ($G_n$), the source ($s_1$) connects to the data line ($D_m$), and the drain ($d_1$) connects to the pixel electrode. The source of the first TFTs ($T_1$) within the same column connect to the same data line, such as data line ($D_m$), the gate of the first TFT ($T_1$) within the same row connects to the same scanning line, such as the scanning line ($G_n$). The gate ($g_2$) of the second TFT ($T_2$) connects to the previous scanning line ($G_{n-1}$), the source ($s_2$) connects to the pixel electrode within the pixel area ($P_{mn}$), the drain ($d_2$) connects to the storage capacitor (C) of the liquid crystal panel. In addition, the drain ($d_2$) of the second TFT ($T_2$) may connect to the pixel electrode within the pixel area ($P_{mn}$), and the source ($s_2$) may connect to the storage capacitor (C) of the liquid crystal panel.

The storage capacitor (C) is arranged on the array substrate of the liquid crystal panel, and the storage capacitor (C) is insulated from the pixel electrode so as to form the capacitor with the pixel electrode for temporarily storing the grayscale voltage of the previous frame. In the embodiment, the storage capacitor (C) is bar-shaped. The plurality of bar-shaped storage capacitors (C) parallel to the data lines ($D_1 \ldots D_{m-1}, D_m, D_{m+1}, D_{m+2}$) and correspond to the data lines one by one. That is, the storage capacitor (C) connected with the drain ($d_2$) of the second TFT ($T_2$) within the pixel area ($P_{mn}$) corresponds to the data line ($D_m$), and the bar-shaped storage capacitors (C) are connected by peripheral wiring ($L_1$).

During the displaying process, the scanning line ($G_1 \ldots G_{n-1}, G_n, G_{n+1}, G_{n+2}$) connects to a gate driver of the liquid crystal panel to receive the gate driving signals provided to the scanning lines in sequence from the gate driver. As such, the first TFT ($T_1$) and the second TFT ($T_2$) corresponding to the scanning lines are turned on. The data lines ($D_1 \ldots D_{m-1}, D_m, D_{m+1}, D_{m+2}$) connect to the data driver of the liquid crystal panel to receive the grayscale driving signals provided by the data driver.

When the scanning line ($G_{n-1}$) receives the gate driving signals (high level), the second TFT ($T_2$) within the pixel area ($P_{mn}$) is turned on such that the grayscale voltage of the previous frame stored in the corresponding capacitor of the pixel area ($P_{mn}$) is transmitted to the storage capacitor (C). Similarly, when the scanning line ($G_n$) receives the gate driving signals, the grayscale voltage is transmitted to the storage capacitor (C) via the second TFT ($T_2$) of the pixel area ($P_{mn}$). As the grayscale voltage is driven by alternately inversion of the positive and negative polarity, the grayscale voltage stored in the capacitors formed by the pixel electrode connected with the corresponding scanning line ($G_n$) and the storage capacitor (C) may include positive polarity and negative polarity, wherein the grayscale voltage stored by the capacitors constitutes the common voltage of the liquid crystal panel in a displaying process. In this way, the common voltage may be optimal, that is, balance in its positive and negative sides. Compared to the conventional solution, manual operations or machine's automatic operations are not needed in the present configuration, and thus the manufacturing cost is decreased and the productivity is ensured.

With respect to the vertical alignment (VA) LCDs, a vertical electrical field has to be applied in a displaying process. That is, the electrical field formed by the voltage difference between the common voltage on the color film substrate and the grayscale voltage on the array substrate. Thus, the grayscale voltage stored by the capacitors has to be transmitted to the common electrode on the color film substrate. Specifically, a peripheral wirings may connect to the peripheral wiring ($L_1$) to connect with the storage capacitor (C) and the common electrode on the color film substrate.

With respect to the Fringe Field Switching (FFS) and In-plane switching (IPS) liquid crystal panels, the horizontal electrical field, which is formed by the voltage difference between the grayscale voltage stored by the capacitors and the grayscale voltage received by the pixel electrode, has to be applied. That is, the peripheral wirings is adopted to connect the peripheral wiring ($L_1$). Thus, the grayscale voltage stored by the capacitors has not to be transmitted to the common electrode on the color film substrate.

Figure 2:
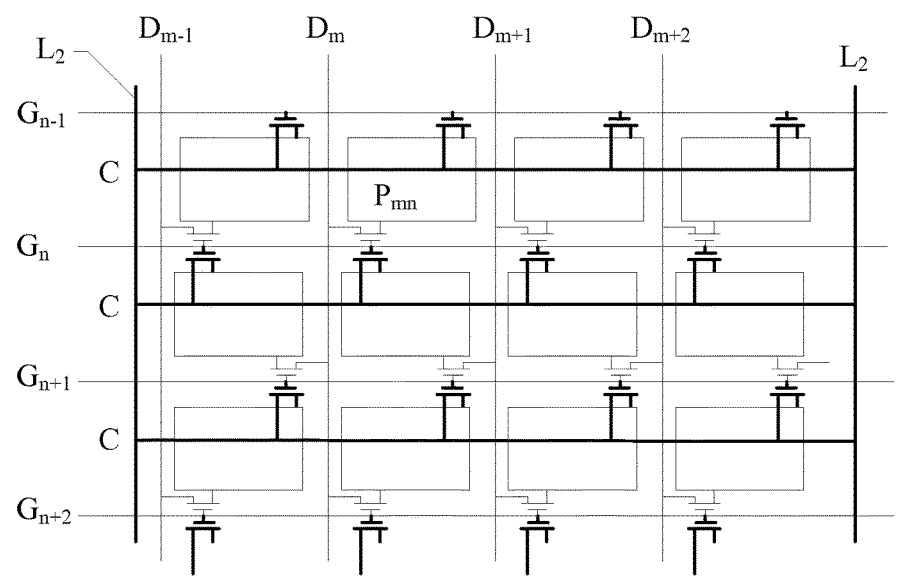
FIG. 2 is a schematic view of the liquid crystal panel in accordance with another embodiment.

FIG. 2 is a schematic view of the liquid crystal panel in accordance with another embodiment. To simply the descriptions, the components in the embodiment that are the same with the first one are marked by the same reference numerals, and thus only the differences between the embodiments will be described hereinafter. As shown in FIG. 2, the plurality of bar-shaped storage capacitors (C) are parallel to the data lines ($D_1 \ldots D_{m-1}, D_m, D_{m+1}, D_{m+2}$), and the bar-shaped storage capacitor (C) are connected via the peripheral wiring ($L_2$) such that the grayscale voltage stored by the capacitors are transmitted to the common electrode on the color film substrate. Regarding the IPS liquid crystal panel, it is not necessary to transmit the grayscale voltage stored by the capacitors to the common electrode on the color film substrate.

Figure 3:
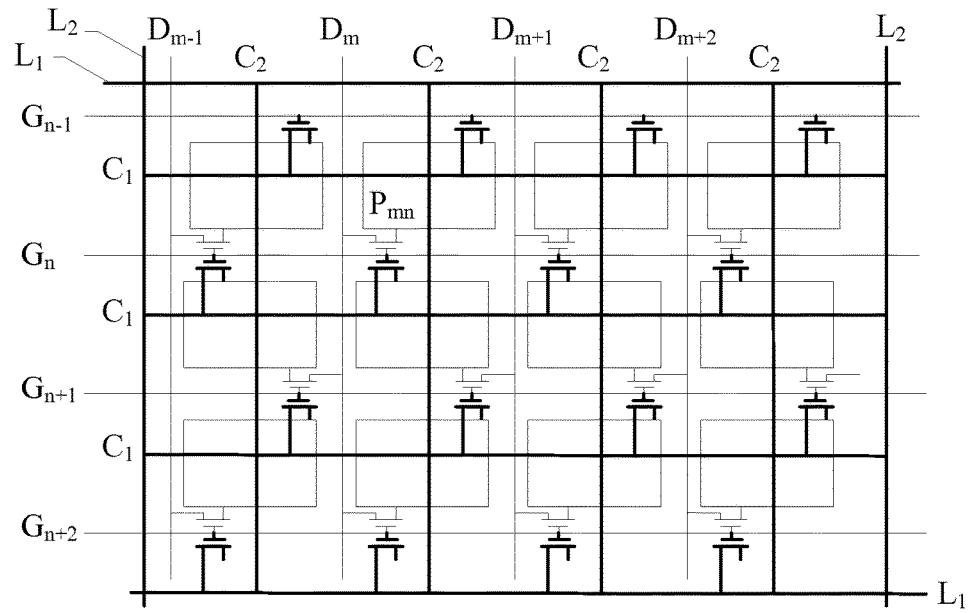
FIG. 3 is a schematic view of the liquid crystal panel in accordance with another embodiment.

FIG. 3 is a schematic view of the liquid crystal panel in accordance with another embodiment. To simply the descriptions, the components in the embodiment that are the same with the first embodiment are marked by the same reference numerals, and thus only the differences between the above embodiments will be described hereinafter. As shown in FIG. 3, the storage capacitors (C) include bar-shaped first capacitors ($C_1$) and second capacitor ($C_2$). The first capacitors ($C_1$) are parallel to the scanning lines ($G_1 \ldots G_{n-1} G_n, G_{n+1}, G_{n-2}$), and the second capacitor ($C_2$) are parallel to the data lines ($D_1 \ldots D_{m-1}, D_m, D_{m+1}, D_{m+2}$). The first capacitors ($C_1$) intersect with the second capacitor ($C_2$), and the first capacitors ($C_1$) are insulated from the second capacitor ($C_2$).

In the embodiment, the operation principles of the liquid crystal panel are the same with the first embodiment. Regarding the VA liquid crystal panel, the grayscale voltage stored by the capacitors is transmitted to the common electrode on the color film substrate via the peripheral wiring connecting the peripheral wiring ($L_1$). In addition, another peripheral wiring is adopted to connect the peripheral wiring ($L_2$) to transmit the grayscale voltage stored in the capacitors to the common electrode on the color film substrate. The peripheral wiring ($L_1$) is insulated from the peripheral wiring ($L_2$). Regarding the IPS liquid crystal panel, the peripheral wirings are needed to connect the peripheral wiring ($L_1$) and the peripheral wiring ($L_2$), and it is not necessary to transmit the grayscale voltage stored by the capacitors to the common electrode on the color film substrate by the peripheral wiring ($L_1$) and the peripheral wiring ($L_2$).

Figure 4:
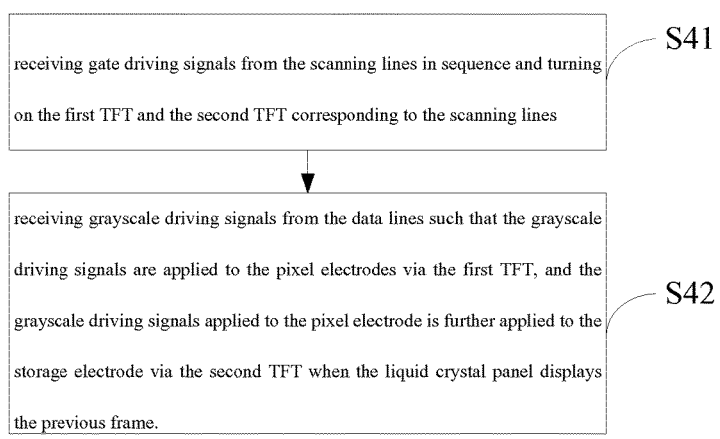
FIG. 4 is a flowchart illustrating the driving method of the liquid crystal panel in accordance with one embodiment.

FIG. 4 is a flowchart illustrating the driving method of the liquid crystal panel in accordance with one embodiment. As shown in FIG. 4, the method includes the following steps.

In block S41, the scanning lines receive the gate driving signals to turn on the first TFT ($T_1$) and the second TFT ($T_2$) corresponding to each of the scanning lines.

In block S42, the data lines receive the grayscale driving signals such that the grayscale driving signals are applied to the pixel electrode via the first TFT ($T_1$). In addition, before the previous frame is displayed, the grayscale driving signals applied to the pixel electrode are applied to the storage electrode via the second TFT ($T_2$).

The details regarding the transmission of the grayscale signals between the first TFT ($T_1$) and the second TFT ($T_2$) and how the storage electrodes process the applied grayscale driving signals may be referenced in the above embodiments.

In view of the above, each of the pixel areas includes two TFTs, wherein one TFT applies the grayscale driving signals to the pixel electrode, and the other one stored the grayscale driving signals applied to the pixel electrode when the previous frame is displayed. As the positive polarity and the negative polarity of the grayscale driving signals (grayscale voltage) is inversed, the common voltage corresponding to two adjacent frames may be balanced. As such, the optimal common voltage is obtained to guarantee the display performance. Manual operations or machine's automatic operations are not needed in the present configuration, and thus the manufacturing cost is decreased and the productivity is ensured.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal display panel, comprising:

a plurality of storage electrodes, a plurality of scanning lines, a plurality of data lines, and a plurality of pixel areas arranged in a matrix defined by the scanning lines and the data lines, wherein each of the pixel areas comprises a pixel electrode, a first thin film transistor (TFT) and a second TFT, wherein the first TFT is configured to drive the pixel electrode within the corresponding pixel area; and wherein in a pixel area defined by a m-th data line and a n-th scanning line, a gate of the first TFT thereof directly connects to the n-th scanning line, a source of the first TFT thereof directly connects to the m-th data line, and a drain of the first TFT thereof directly connects to the pixel electrode thereof, a gate of the second TFT thereof directly connects with a (n−1)-th scanning line previous to the n-th scanning line, wherein m and n are positive integers, one of a source and a drain of the second TFT thereof directly connects to the corresponding pixel electrode same to what is directly connected to the drain of the first TFT, and the other of the source and the drain of the second TFT thereof directly connects with the bar-shaped storage electrodes arranged in a rim of the matrix, wherein the storage electrodes comprises first storage electrodes and second storage electrodes, the first storage electrodes are parallel to the scanning lines respectively, and the second storage electrodes are parallel to the data lines respectively, the first storage electrodes intersect with the second storage electrodes, and the first storage electrodes are insulated from the second storage electrodes; each of the first storage electrodes correspond to a row of pixel areas, each of the second storage electrodes correspond to a column of pixel areas, and the source or the drain of the second TFT of each of the corresponding row of pixel areas or the source or the drain of the second TFT of each of the corresponding column of pixel area is all directly connected to a same first storage electrode or a same second storage electrode, wherein the number of the first storage electrodes is the same as the numbers of the second storage electrodes and the pixel electrodes, wherein a source of the first TFT directly connects to the corresponding data line, a drain of the first TFT directly connects to the corresponding pixel electrode, and wherein the liquid crystal display panel further comprises a gate driver and a data driver, the scanning lines connect with the gate driver, and the data lines connect with the data driver, the gate driver provides gate driving signals to the scanning lines in sequence to turn on the first TFT and the second TFT corresponding to the scanning lines, the data driver provides grayscale driving signals to the data lines such that the grayscale driving signals are applied to the pixel electrodes via the first TFT, and the grayscale driving signals applied to the pixel electrode is further applied to the storage electrode via the second TFT when the liquid crystal display panel displays a previous frame.

2. The liquid crystal display panel as claimed in claim 1, wherein the bar-shaped storage electrodes are parallel to the data line respectively, each of the bar-shaped storage electrodes correspond to a corresponding row of pixel areas, and the source or the drain of the second TFT of each of the corresponding row of pixel areas is all directly connected to a same bar-shaped storage electrode.

3. The liquid crystal display panel as claimed in claim 1, wherein the bar-shaped storage electrodes are parallel to all of the scanning lines respectively, each of the bar-shaped storage electrodes correspond to a corresponding column of pixel areas, and the source or the drain of the second TFT of each of the corresponding column of pixel areas is all directly connected to a same bar-shaped storage electrode.

4. The liquid crystal display panel as claimed in claim 1, wherein the liquid crystal display panel further comprises peripheral wirings for connecting the storage electrodes and a common electrode on a color film substrate of the liquid crystal display panel.

5. The liquid crystal display panel as claimed in claim 1, wherein the liquid crystal display panel further comprises peripheral wirings for connecting the first storage electrodes and a common electrode on a color film substrate of the liquid crystal display panel and for connecting the second storage electrodes and the common electrode.

* * * * *